United States Patent [19]

Yoon

[11] Patent Number: 4,994,784
[45] Date of Patent: Feb. 19, 1991

[54] PAGING RECEIVER
[75] Inventor: Young-Han Yoon, Daegu, Rep. of Korea
[73] Assignee: SamSung Electronics Co., Ltd., Suweon, Rep. of Korea
[21] Appl. No.: 317,756
[22] Filed: Mar. 2, 1989
[30] Foreign Application Priority Data Mar. 29, 1988 [KR] Rep. of Korea ............... 88-3404

[51] Int. Cl.$^5$ ............................................. H04Q 1/30
[52] U.S. Cl. ........................... 340/311.1; 340/825.44; 340/792
[58] Field of Search ........... 340/311.1, 825.44, 825.45, 340/825.46, 825.47, 792, 756

[56] References Cited
U.S. PATENT DOCUMENTS 4,626,842 12/1986 Ichikawa et al. ............... 340/825.44
4,646,081 2/1987 Tsunoda ........................... 340/792

Primary Examiner—Joseph A. Orsino
Assistant Examiner—Geoff Sutcliffe
Attorney, Agent, or Firm—Bushnell, Robert E.

[57] ABSTRACT

A method capable of displaying the message at one time by detecting a message of 12 digits when receiving the message over 15 digits in a paging receiver of a POCSAG code system. According to one aspect of the present invention, in a paging receiver system having a display for 12 digits and utilizing a POCSAG code transmitting 5 digits per message code word. The method includes: a first step for deciding whether or not more than 3 message code words are received after all transmitting messages are received; a second step for storing and displaying the received digits in case of less than 2 message code words are received at said first step; a third step deciding whether or not the digits other than 12 digits are space characters when more than 3 message code words are received at said first step, and if they are not the space characters, then proceeding to said second step; and a fourth step which stores and displays the 12 digits after ignoring the corresponding digits in case space characters are found at said third step.

8 Claims, 6 Drawing Sheets

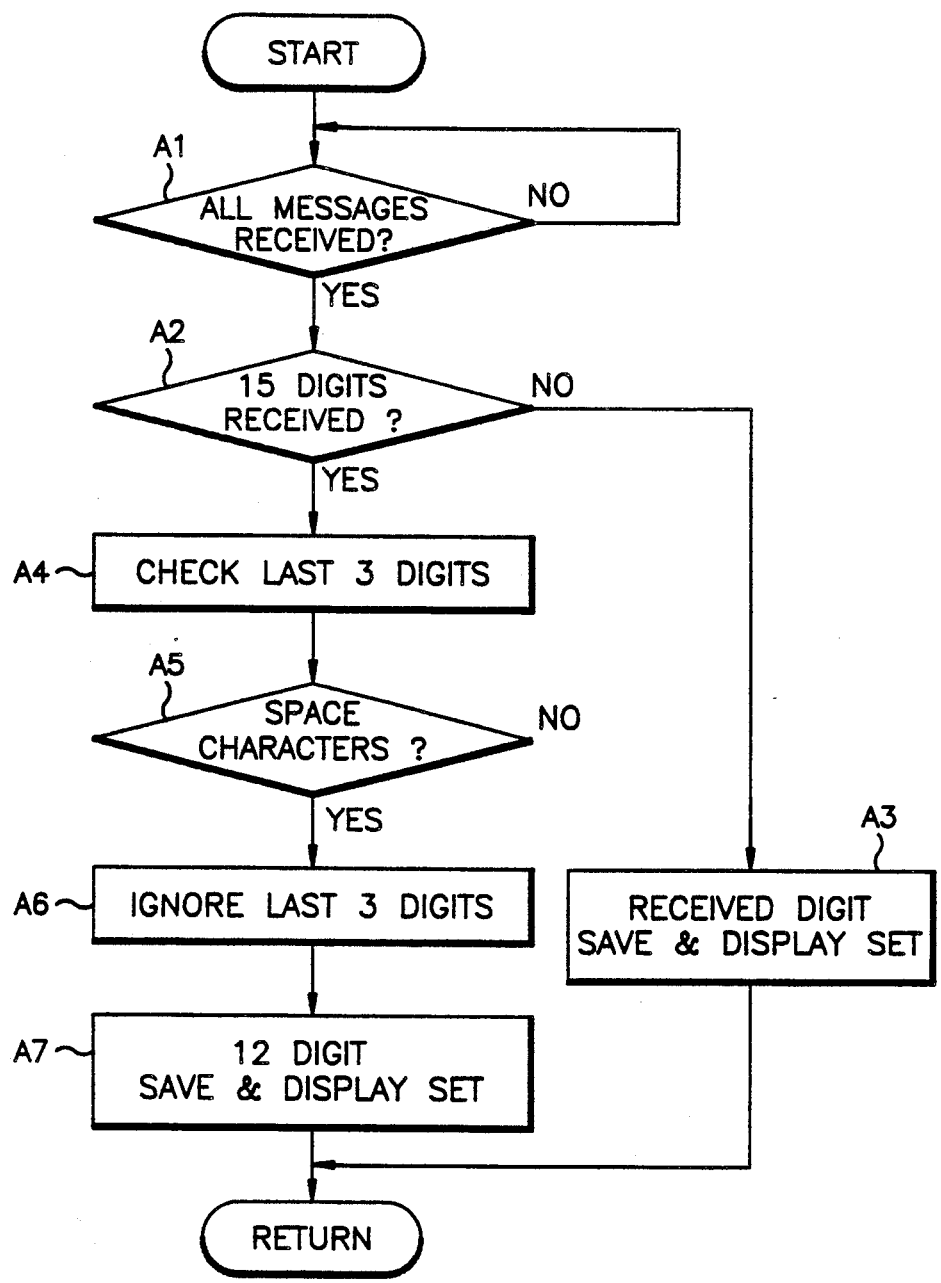
FIF. 4C

PAGING RECEIVER

BACKGROUND OF THE INVENTION

The present invention relates to a paging receiver, and in particular to a receiving-message displaying for a paging receiver which utilizes the code of the POCSAG system (Post Office Committee Standard Association Group code format).

The term "Paging receiver" means a mobile radio which receives an individual call signal through a paging station. FIG. 1 is a block diagram of a typical paging receiver, which includes: an antenna 1 for receiving a modulation signal of transmission data propagating on air; a RF (radio frequency) receiving stage 2 for demodulating the modulated signal received through antenna 1 and then reshaping the signal to digital data; a control stage 3 in which data from RF receiving stage is processed and controlled, and various control signals such as a power saving signal are produced; a memory 4 which stores therein frame data to 3 bits and address data of 16 bits for seeking its own specified address data from among specified own data of the received data and which is read out by said control stage 3 upon an initializing sequence according to a power ON of the receiver; an alarm 5 for driving an alarm signal when its own address data is sought under the control of said control means 3; a speaker 6 for producing an alarm sound according to the alarm signal through the alarm; and a display 7 for displaying the received message under the control of said control means 3.

FIG. 2 is a schematic diagram showing a preferred format of the POCSAG code utilizing in a paging receiver, wherein a POCSAG code includes a preamble signal and number of batches, a batch includes a word sync and 8 frames, a frame includes an address code word of 32 bits and a message code word of 32 bits, and therein a transmission speed is 512 bps.

The operational steps of a paging receiver utilizing the POCSAG code will be explained in accordance with above-mentioned configuration. Generally, a paging receiver receives a RF (radio frequency) signal transmitted with modulation into FSK-NRZ (frequency shift keying - non return to zero) through the antenna 1, and the RF receiving means 2 demodulates the RF modulation signal and then reshapes the waveform into a digital signal of binary code. In addition, the memory 4, for which a PROM may be used, stores its own specified address of the paging receiver and its own frame data. Therefore, when control means 3 receives a message of POCSAG code as shown in FIG. 2, it receives a messge of its own frame according to the content of said memory 4, in which the operating steps are as follows.

After detecting a preamble signal received prior to a number of batch messages as (2b) in FIG. 2, a bit synchronization of the data receiving clock is made according to the preamble signal detected and the received data is checked therefrom. The control stage 3 reads out the address data stored in memory 4, stores them to a RAM which is an internal memory, and stores also an address code word among its own frame data received as (2d) in FIG. 2 into the internal RAM. Thereafter they are read out and compared respectively at an accumulator ALU (not shown) of the control means. Then, a message code word among its own frame data is stored in an internal buffer memory and, when the received data compared at accumulator ALU is judged as, an alarm tone is produced through the alarm 5 and the speaker 6. At the same time, a corresponding message is displayed on the display 7.

In a case of a paging receiver adopting a POCSAG code, since the POCSAG code is usually transmitted by 5 digits per unit, display 7 has been applied with a LCD (liquid crystal display) device for displaying 10 digits.

Generally, phone number configurations including an ordinary area code or an intra-office number are as follows.

For a number "5036558940", for example:
phone number 655 8940;
area code 503.
for a number "7450084414", for example:
internal exchange number 414;
phone number 7450084.

However, in a recent paging receiver, a bit "—" is inserted so that an user can easily recognize the message, and therefore a message of 12 digits is transmitted as below.

"503-655-8940";
"745-0084-414".

In the case of POCSAG code as aforementioned, since a transmitting side transmits 5 digits per one message code word as shown by example (3a) in FIG. 3, the message digits capable of receiving at a paging receiver side become a multiple of 5 such as 5, 10, 15, 20, . . . Therefore, when the display 7 is 10-digit LCD, the display arrangement is simple, while when it is 12-digit LCD, the display arrangement will be difficult in a paging receiver utilizing a POCSAG code. That is to say, in case of displaying the message of 12 digits, since a transmitting side transmits the 15 digits signal including a space character of 3 digits, a receiving side has to display the message at two times as shown by example (3c) in FIG. 3, and there arises a problem that two memories are required.

SUMMARY OF THE INVENTION

Therefore, it is an object of the present invention to provide a method capable of displaying the message at one time by detecting a message of 12 digits when receiving the message over 15 digits in a paging receiver of a POCSAG code system.

According to one aspect of the present invention, in a paging receiver system having a display for 12 digits and utilizing a POCSAG code transmitting 5 digits per message code word, the method includes: a first step for deciding whether or not more than 3 message code words are received after all transmitting messages are received; a second step for storing and displaying the received digits in case of less than 2 message code words at said first step; a third step deciding whether or not the digits other than 12 digits are the space characters when it is more than 3 message code words at said first step, and if they are not the space characters, then proceeding to said second step; and a fourth step which stores and displays the 12 digits after ignoring the corresponding digits in case of space characters at said third step.

FIGS. (2a) to (2d) are diagrams illustrative of a POCSAG code format.

FIGS. (3a) to (3d) are diagrams illustrative of conventional message displaying forms.

Figure 4A:
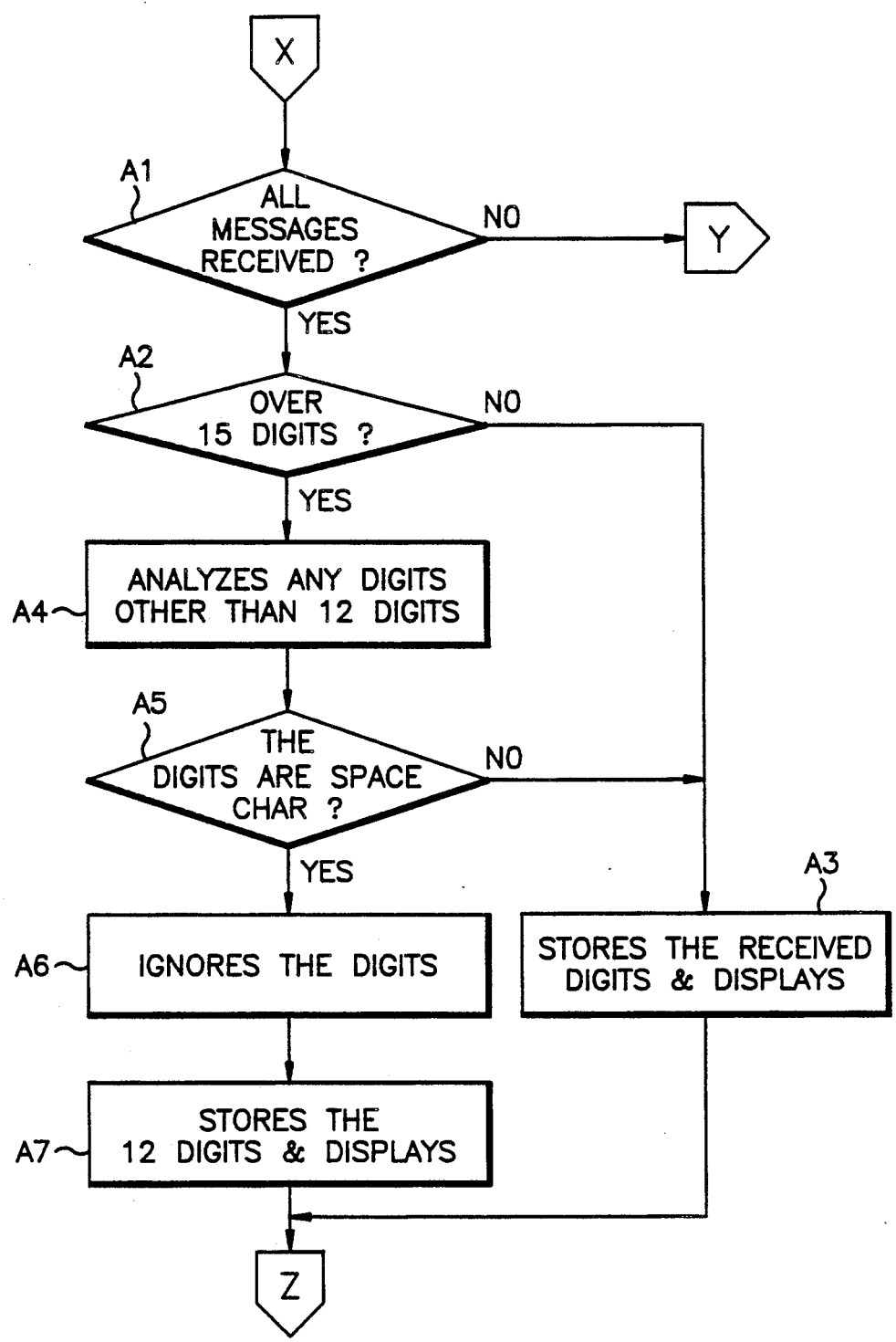
Figure 4B:
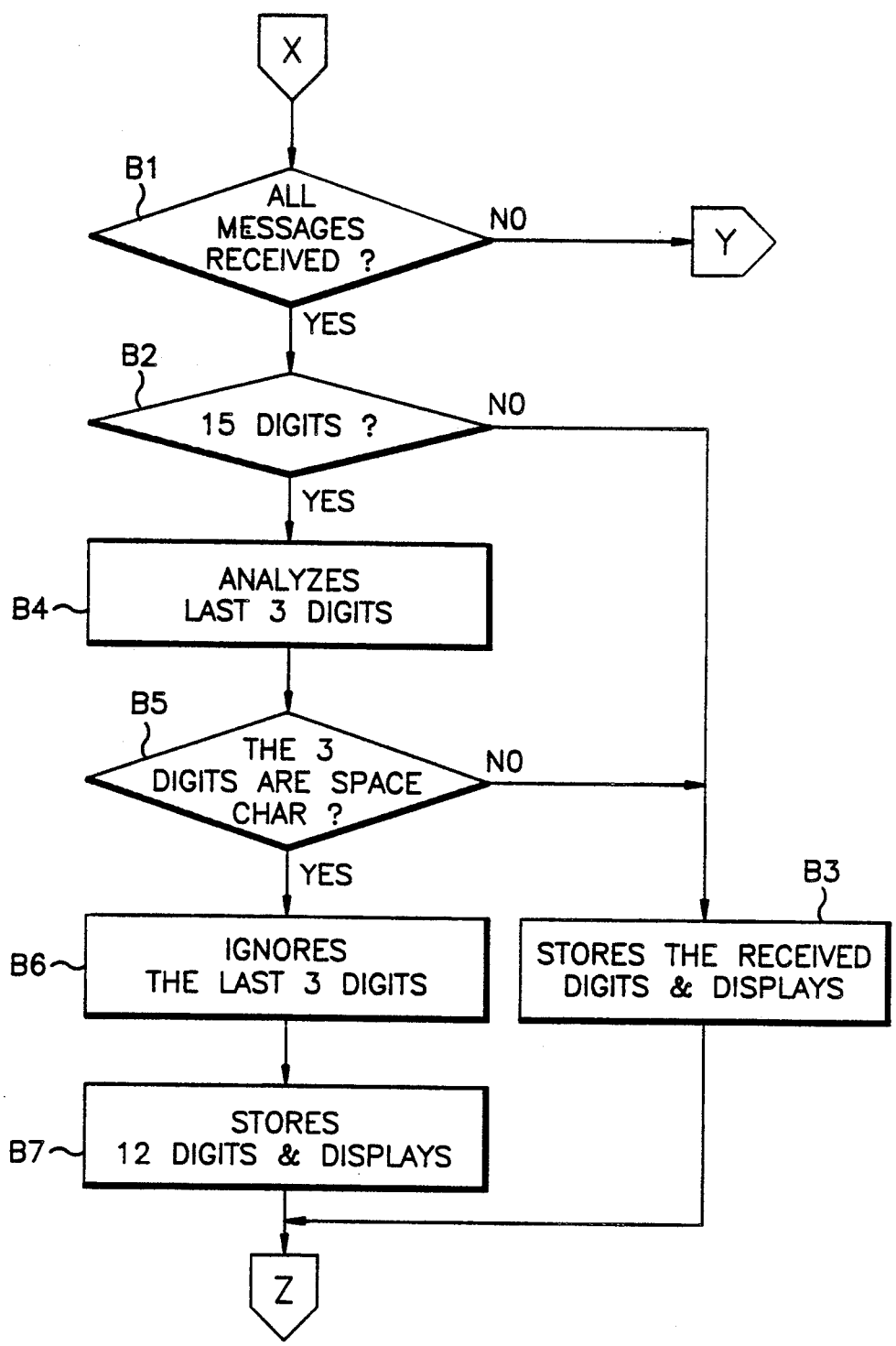

FIGS. 4A and 4B are flow charts of preferred embodiments according to the present invention.

Figure 5:
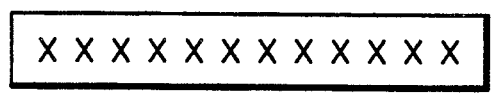

FIG. 5 is a diagram illustrative of a message displaying form of the preferred embodiment according to the present invention.

DETAILED DESCRIPTION OF THE INVENTION

The preferred embodiment of the present invention will be explained in detail with reference to the accompanying drawings hereinbelow.

FIG. 4A is a flow chart of an embodiment of the present invention, including a process having: a step A2 which checks whether or not the messages are received in excess of three message code words; after all transmitting message are received at step A1; a step A3 which stores and displays the received data digits in case of less than two message code words, are determined at said step A2 to have been received; a step A5 which, after analyzing any digits other than the 12 digits at step A4 in case of the determination at said step A2 checks whether or not the corresponding digits are space characters, and then proceeds to said step A3 when it is not so; and a step A7 which stores and displays the 12 digits, in case of a determination of space characters at said step A5, by ignoring the corresponding digits that over three message code words were received as said step A6.

FIG. 4B is a flow chart in which the digits of a received message are 15 digit. FIG. 5 is a diagram of the display form of a 12 digit message according to the present invention.

Figure 1:
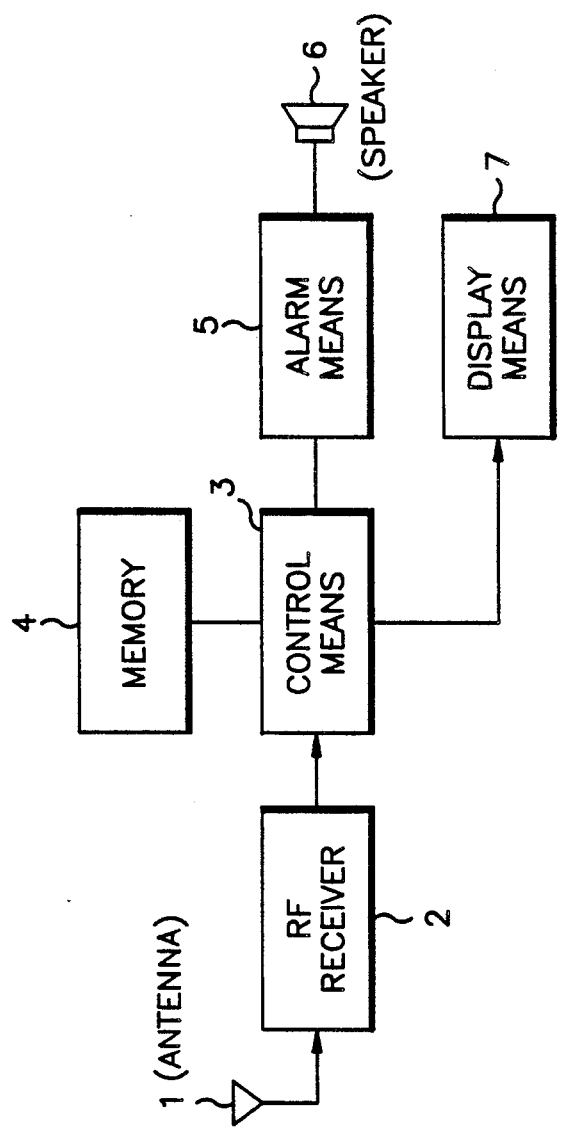
FIG. 1 is a block diagram of a conventional paging receiver.
Figure 2:
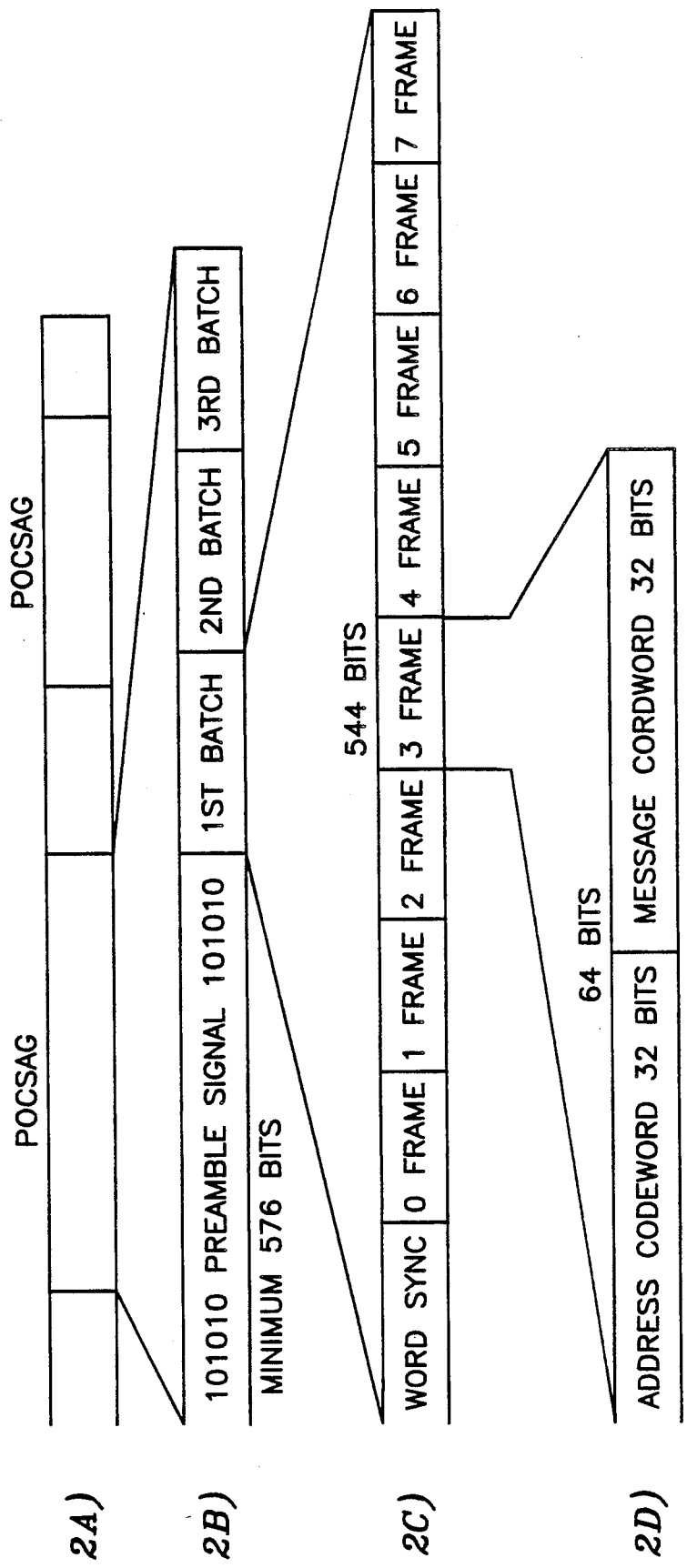

A block diagram of a paging receiver for executing the present invention is similar to the aforesaid FIG. 1, and a code form applied is also the same POCSAG as the aforementioned FIG. 2, and each of the function and each reference numerals are the same.

The flow of the present invention which receives a message of over fifteen digits and checks whether or not an actual message is a message of twelve digits, thereafter displaying in response to the actual message's digits of corresponding received message, proceed as follows. Firstly, it will be explained by reference of FIG. 4A.

Figure 3:
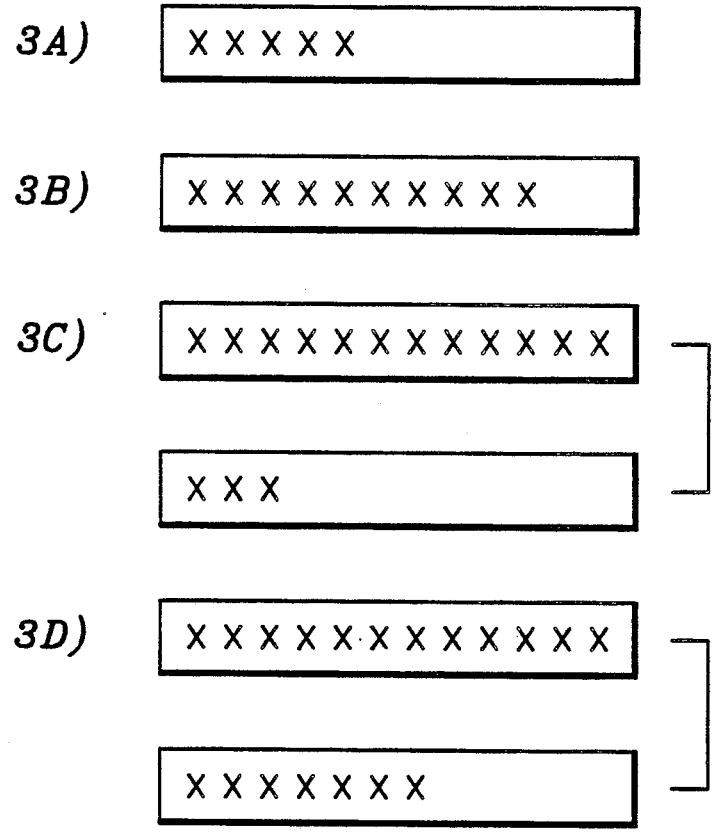

In a receiver, a message received through a RF receiving stage 2 is checked at step A1, in case that message receiving is completed and the process then proceeds to step A2, and checks whether or not the received message is over fifteen digits. When it is less than fifteen digits at said step A2, since it is either the case of 5 digits message received (1 message code word) or 10 digits message received (2 message code words), it proceeds to step A3 and stores a message of received digits and then display a message at a display 7 as (3a) and (3b) in FIG. 3. At this moment, when a received message is more than 15 digits at said step A2, since it is the case of receiving more than three message code words, it proceeds to a step A4 and analyzes the condition of excess digits except 12 digits. This, as described above, since display 7 can display a message of twelve digits at a time, is for analyzing the condition of all digits other than twelve digits that can be displayed at a display 7. After executing said step A4, and at step A5, it is checked whether or not the condition of all digits other than twelve digits are the space characters, when the digits analyzed at said step A4 are not spaced characters, since this represents the message having more than twelve digits, all digits can not be displaed within a display means 7. That is to say, since the received digits are more than thirteen digits, it proceeds to step A3, and stores the received digits and displays the fifteen digits or twenty digits as (3c) (3d) in FIG. 3. In addition, it can be displayed by the same method as aforementioned in case of more than twenty digits (receiving more than for message code words) also. When corresponding digits are the space characters at step A5, since this means that the received actual message is twelve digits, it proceeds to step A6 and ignores the corresponding space characters, and next at step A7, stores the message of twelve digits and displays the message of twelve digits at a time as in FIG. 5.

FIG. 4(B) is a flow chart of a preferred embodiment in case the received digits being 15 digits, wherein it checks whether or not the received message through a RF receiving stage 2 is fifteen digits at step B2. At this moment, in case that the received digits are fifteen digits at said step B2, after analyzing the condition of last three digits among the received 15 digits at step B4, then proceeds to step B5 and checks whether or not the last three digits are space characters. At this moment, when the last three digits are the space characters, since the actually received messate is twelve digits, the last three digits' data are ignored at step B6, and next at step B7, the corresponding twelve digits' message as in FIG. 5 is display at a display 7 for the twelve digits' display.

As described above, in a paging receiver utilizing a POCSAG code, in case of utlizing a display means for twelve digits' message display in accordance with the recent tendency, it checks the digits condition of more than twelve digits among the received message, while in case of the space characters that is not a practical message, since the corresponding space characters can be ignored and displayed at a time, there is an advantage that the capacity of memory can be save. Furthermore, a user can easily recognize the content of a message.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A process for displaying paging receiver message, comprising:
   receiving a message of five-unit code words in a POCSAG code, with any said unit able to contain a character or a space;
   storing and displaying said code words if said message does not contain three or more of said code words;
   determining, if said message contains three or more or said code words, whether units of said code words received in excess of twelve units contain spaces;
   storing and displaying said code words in integer multiples of one code word if said message contains three or more of said code words and units of said code words in excess of twelve units do not all contain spaces; and
   storing and displaying twelve units of said code words received if more than two of said code words are received and units of said code words received in excess of twelve units all contain spaces.

2. The process of claim 1, further comprised of performing the step of determining whether the number of said code words in said message exceed a predetermined values, after receiving but before storing said code words.

3. The process of claim 1, further comprised of performing the step of determining whether the number of said code words in said message is greater than three, after receiving but before storing said code words.

4. A process for displaying paging receiver messages, comprising:
   receiving a message of five-unit code words in a POCSAG code, with any said unit able to contain a character or a space;
   storing and displaying said code words if two or less, of said code words are received;
   determining, if more than two of said code words are received, whether units of said code words received in excess of twelve units contain spaces;
   storing and displaying said code words in integer multiples of one code word if more than two of said code words are received and units of said code words received in excess of twelve units do not all contain spaces; and
   storing and displaying twelve units of said code words received if more than two of said code words are received and units of said code word received in excess of twelve units all contain spaces.

5. The process of claim 4, further comprises of performing the step of determining whether the number of said code words in said message exceed a predetermined value, after receiving but before storing said code words.

6. The process of claim 4, further comprised of performing the step of determing the whether the number of said code words in said message is greater than three, after receiving but before storing said code words.

7. A process for displaying paging receiver messages, comprising:
   receiving a message of code words in a POCSAG code with each of said code word containing five units and with any said unit able to contain a character or a space;
   storing and displaying said code words if said message contains less than fifteen of said units;
   determining, if fifteen of said units are received, whether units of said message in excess of twelve units contain spaces;
   storing and displaying said code words in integer multiples of one code word if fifteen of said units are received and said units of said message in excess of twelve units do not all contain spaces; and
   storing and displaying twelve units of said code words received if fifteen or more of said units are contained in said message received and units of said message received in excess of twelve units all contain spaces.

8. The process of claim 7, further comprised of performing the step of determining whether the number of said units contained in said message is greater than fifteen, after receiving but before storing said message code words.

* * * * *

UNITED STATES PATENT AND TRADEMARK OFFICE
CERTIFICATE OF CORRECTION

PATENT NO.  : 4,994,784

DATED       : Feb. 19, 1991

INVENTOR(S) : Yoon

It is certified that error appears in the above-identified patent and that said Letters Patent is hereby corrected as shown below:

In the drawings, sheet 6, consisting of figure 4c should be deleted.

Signed and Sealed this

Twenty-fifth Day of June, 1991

Attest:

HARRY F. MANBECK, JR.

*Attesting Officer*  *Commissioner of Patents and Trademarks*